(12) United States Patent
Messing

(10) Patent No.: US 11,560,824 B2
(45) Date of Patent: Jan. 24, 2023

(54) APPLIED-IGNITION INTERNAL COMBUSTION ENGINE AND METHOD FOR OPERATING THE INTERNAL COMBUSTION ENGINE

(71) Applicant: Bayerische Motoren Werke Aktiengesellschaft, Munich (DE)

(72) Inventor: Roman Messing, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/423,748

(22) PCT Filed: Dec. 9, 2019

(86) PCT No.: PCT/EP2019/084250
§ 371 (c)(1),
(2) Date: Jul. 16, 2021

(87) PCT Pub. No.: WO2020/148019
PCT Pub. Date: Jul. 23, 2020

(65) Prior Publication Data
US 2022/0120206 A1 Apr. 21, 2022

(30) Foreign Application Priority Data
Jan. 17, 2019 (DE) ..................... 10 2019 101 138.8

(51) Int. Cl.
*F01N 13/10* (2010.01)
*F01N 3/04* (2006.01)
(Continued)

(52) U.S. Cl.
CPC ........... *F01N 13/107* (2013.01); *F01N 3/046* (2013.01); *F02B 37/025* (2013.01); *F02D 23/00* (2013.01);
(Continued)

(58) Field of Classification Search
CPC .... F01N 3/046; F01N 13/107; F01N 2340/06; F02B 37/025; F02D 23/00; F02D 37/02; F02D 41/0082; F01P 2003/024
See application file for complete search history.

(56) References Cited

U.S. PATENT DOCUMENTS 9,133,745 B2 * 9/2015 Zahdeh ................. F02B 37/025
9,303,555 B2 4/2016 Wu et al.
(Continued)

FOREIGN PATENT DOCUMENTS

CN 1306604 A * 8/2001 ........... F01N 13/009
CN 104100346 A 10/2014
(Continued)

OTHER PUBLICATIONS

PCT/EP2019/084250, International Search Report dated May 12, 2020 (Three (3) pages).
(Continued)

*Primary Examiner* — Audrey B. Walter
(74) *Attorney, Agent, or Firm* — Crowell & Moring LLP

(57) ABSTRACT

An applied-ignition internal combustion engine includes first and second combustion chambers, an exhaust-gas system with an exhaust-gas purification system is disposed at the first and second combustion chambers, and an exhaust-gas manifold. An exhaust gas from a combustion of a an air/fuel mixture firstly flows through the exhaust-gas manifold and subsequently flows through the exhaust-gas purification system. A first section of the exhaust-gas system from the first combustion chamber to the exhaust-gas purification system is cooled more than a second section of the exhaust-gas system from the second combustion chamber to the exhaust-gas purification system. The first combustion chamber is operated with a lean air/fuel mixture, the second combustion chamber is operated with a rich air/fuel mixture,
(Continued)

and an overall exhaust-gas lambda value at an inlet into the exhaust-gas purification system is stoichiometric.

8 Claims, 2 Drawing Sheets

(51) Int. Cl.
    *F02D 23/00*     (2006.01)
    *F02D 37/02*     (2006.01)
    *F02D 41/00*     (2006.01)
    *F02B 37/02*     (2006.01)
    *F01P 3/02*     (2006.01)

(52) U.S. Cl.
    CPC ......... *F02D 37/02* (2013.01); *F02D 41/0082* (2013.01); *F01N 2340/06* (2013.01); *F01P 2003/024* (2013.01)

(56) References Cited

U.S. PATENT DOCUMENTS

| 2015/0059339 | A1 | | 3/2015 | Zahdeh et al. |
| 2016/0017833 | A1 | | 1/2016 | Ulrich et al. |
| 2020/0408165 | A1 | * | 12/2020 | Yoshimura ............. F02P 5/045 |

FOREIGN PATENT DOCUMENTS

| DE | 102 54 683 | A1 | | 6/2004 | |
| DE | 10254683 | A1 | * | 6/2004 | ........... F01N 13/009 |
| DE | 10 2008 047 722 | A1 | | 3/2010 | |
| DE | 10 2012 001 199 | A1 | | 7/2013 | |
| DE | 10 2012 003 310 | A1 | | 8/2013 | |
| DE | 10 2014 104 402 | A1 | | 10/2014 | |
| DE | 10 2014 213 825 | A1 | | 1/2016 | |
| DE | 10 2014 216 461 | A1 | | 2/2016 | |
| DE | 10 2016 202 351 | A1 | | 8/2017 | |
| DE | 102016212945 | A1 | * | 1/2018 | ......... F02D 13/0219 |
| DE | 10 2016 119 212 | A1 | | 4/2018 | |
| WO | WO-2018216151 | A1 | * | 11/2018 | ............. F02D 15/00 |

OTHER PUBLICATIONS

German Search Report issued in German application No. 10 2019 101 138.8 dated Jun. 6, 2019, with Statement of Relevancy (Seven (7) pages).

Chinese Office Action issued in Chinese application No. 201980076727.9 dated Jun. 29, 2022, with English translation (Fourteen (14) pages).

* cited by examiner

APPLIED-IGNITION INTERNAL COMBUSTION ENGINE AND METHOD FOR OPERATING THE INTERNAL COMBUSTION ENGINE

BACKGROUND AND SUMMARY OF THE INVENTION

The invention relates to an applied-ignition internal combustion engine and to a method for operating the internal combustion engine.

With regard to the technical field, reference is made for example to the German published patent application DE 10 2008 047 722 A1. The document discloses a method for operating an exhaust-gas purification system which is arranged at an internal combustion engine capable of lean operation, in particular an Otto internal combustion engine for a motor vehicle. The exhaust gas of the internal combustion engine flows in an exhaust-gas purification system firstly through a nitrogen oxide storage catalytic converter and onward through an SCR catalytic converter, wherein the exhaust gas has an exhaust-gas temperature dependent on the present operating state of the internal combustion engine and contains inter alia nitrogen oxides as pollutants. The internal combustion engine is operated with a lean air/fuel mixture ($\lambda > 1$) if the operating state of the internal combustion engine generates an exhaust-gas temperature above a particular temperature and, during this lean operating state, a reducing agent is fed to the exhaust gas upstream of the SCR catalytic converter. The internal combustion engine is operated with a stoichiometric air/fuel mixture ($\lambda = 1$) if the operating state of the internal combustion engine generates an exhaust-gas temperature below the particular temperature. The conflict of aims between increased fuel consumption as a result of a long period of homogeneous operation after a cold start and a breakthrough of $NO_x$ owing to an absence of operational readiness of the SCR system is resolved by means of the method according to the invention.

To comply with exhaust gas legislation, it has been the case for decades that exhaust-gas catalytic converters are used in order to reduce the pollutants in the untreated emissions of internal combustion engines to a minimum level by means of chemical secondary reactions. In order to increase the power density of internal combustion engines, exhaust-gas turbochargers have been prior art in the field of internal combustion engines for many years. Since both the catalytic coating and the substrate material of a catalytic converter and the turbine of an exhaust-gas turbocharger can be subjected to temperature loading only up to a certain level, the maximum exhaust-gas temperature of the internal combustion engine is limited to this temperature. Since, furthermore, the exhaust-gas temperature level is proportional to the power density of an internal combustion engine, the power density of the internal combustion engine is limited by the maximum admissible temperatures for an exhaust-gas turbocharger and a catalytic converter.

The maximum admissible temperature upstream of a turbine of an exhaust-gas turbocharger basically lies above that of the catalytic converter because the turbine is arranged upstream of the catalytic converter in a flow direction of the exhaust gas. At the same time, the turbine extracts enthalpy from the exhaust gas mass flow in order to thus compress the charge air by means of the compressor, whereby the turbine, in supercharged operation, yet further increases the temperature delta between temperature upstream of the turbine and temperature upstream of the catalytic converter.

Owing to the relationship between exhaust-gas temperature limitation by the above-stated components and the power density of the internal combustion engine, there are already numerous technologies and operating strategies for internal combustion engines in order to lower the exhaust-gas temperature and thus increase the power density of the internal combustion engine. Two of these possibilities are the so-called Miller strategy, which is known to a person skilled in the art, and cooled exhaust-gas manifolds, which may inter alia also be implemented in the cylinder head of the internal combustion engine. This case is referred to as a cylinder-head-integrated manifold. Whilst the cooled exhaust-gas manifold can lower the exhaust-gas temperature only downstream of the gas exchange outlet valves, and thereby lowers the overall level of the exhaust-gas temperature, the Miller strategy acts already in the combustion chamber. Owing to relatively cool process temperatures, the knocking tendency of the internal combustion engine is lowered, whereby the so-called center of combustion can be advanced. In this case, the combustion process is made more optimum and thus likewise lowers the exhaust-gas temperatures.

Classic enrichment, in the case of which a greater fuel mass than that required at the present operating point of the internal combustion engine is injected and thus contributes to cooling, and also leaning, that is to say a higher air mass than is presently necessary, are likewise measures for lowering the exhaust-gas temperature.

The above-described enrichment ($\lambda < 1$), which has been prior art until now, will no longer be used owing to future emissions control. This results in great losses with regard to the power density of internal combustion engines. Leaning ($\lambda > 1$) likewise places increased demands on the exhaust-gas aftertreatment system owing to the increased $NO_x$ emissions, and is thus associated with high costs.

The German published patent application DE 10 2014 216 461 A1, which the present invention takes as a starting point, has disclosed an internal combustion engine having a cylinder head for four cylinders in an in-line arrangement and with an inlet-side and an outlet-side gas exchange valve drive. Within the cylinder head, a first outlet channel of the first cylinder opens into a second outlet channel of the second cylinder, and a fourth outlet channel of the fourth cylinder opens into a third outlet channel of the third cylinder, wherein a control time of the outlet-side gas exchange valve drive can be shortened. By means of this configuration according to the invention of the internal combustion engine, improvements are attained with regard to the fuel consumption and the response behavior of the internal combustion engine.

For the purposes of component protection, in particular for the purposes of protecting an exhaust-gas purification system, such as for example a catalytic converter, it is desirable to reduce the exhaust-gas temperature of an internal combustion engine.

It is an object of the present invention to specify a measure for reducing the exhaust-gas temperatures of an internal combustion engine.

By means of the concept according to the invention, the so-called $\lambda$ split, the exhaust-gas temperatures can be lowered without thereby globally departing from $\lambda = 1$ operation and thus necessitating further efforts with regard to emissions control. In combination with a cylinder-head-integrated manifold, it is furthermore possible by means of cylinder-specific ignition angles for the temperature gradient between the individual channels to be lowered and further power potential of the internal combustion engine to be increased.

In a particularly preferred embodiment, a turbine housing of an exhaust-gas turbocharger is arranged in the exhaust-gas system between the exhaust-gas manifold and the exhaust-gas purification system. By means of this measure, the invention can be used not only for naturally aspirated internal combustion engines but also for internal combustion engines with an exhaust-gas turbocharger.

The configuration where the exhaust-gas manifold is integrated at least in a section in a cylinder head of the internal combustion engine is a particularly preferred design variant. With this compact design, particularly good exhaust-gas cooling, in particular with a cylinder-specific ignition angle, is achieved.

A further improvement in the cooling of the exhaust gas can be attained with a feature of the present invention.

A configuration advantageously increases the dynamics of the internal combustion engine.

A logical channel separation is in turn a particularly preferred embodiment.

With the internal combustion engine, a method for operating the applied-ignition internal combustion with the following method steps, is now possible:
  introducing air and fuel into the first combustion chamber with a rich ratio,
  igniting and combusting the air/fuel mixture in the first combustion chamber,
  discharging the exhaust gas through the exhaust-gas system,
  introducing air and fuel into the second combustion chamber with a lean ratio,
  igniting and combusting the air/fuel mixture in the second combustion chamber,
  discharging the exhaust gas through the exhaust-gas system.

A yet further lowering of the exhaust-gas temperature can be achieved by the method steps of:
  adapting a center of combustion in the first combustion chamber until an exhaust-gas temperature from the first combustion chamber is at a minimum,
  adapting a center of combustion in the second combustion chamber until an exhaust-gas temperature from the second combustion chamber is at a minimum.

In other words:
In the context of the present invention, it is thus provided that the individual cylinders of an internal combustion engine be operated with different lambda values, that is to say one cylinder rich and the other cylinder lean, in order to thus lower the exhaust-gas temperature level upstream of the exhaust-gas purification system or upstream of the turbine of an exhaust-gas turbocharger (illustrated in FIG. 2). The "trimming" of the lambda value must in this case be performed such that the exhaust-gas lambda value after mixing of the exhaust gas of the individual cylinders upstream of the exhaust-gas purification system is again exactly 1 and thus stoichiometric. A 3-way catalytic converter can thus fully convert the pollutants in the untreated exhaust gas, analogously to classic $\lambda=1$ operation. In the case of internal combustion engines with an even number of cylinders, it is possible here for one half of the cylinders to be operated lean and the other half to be operated rich. By means of this operation according to the invention of the internal combustion engine, the exhaust-gas temperature is lowered, and the power density the internal combustion engine can thus be increased. If, additionally, the ignition angles, that is to say the ignition time of the individual cylinders, are adapted individually to a minimal exhaust-gas temperature, a further lowering of the exhaust-gas temperature level is achieved. This is in particular because, as a result of the rich operation, the knocking tendency is considerably reduced, and thus a better center of combustion can be realized, which additionally contributes to the temperature lowering. The further a cylinder is shifted toward lean or toward rich, the greater is the lowering of the temperature in relation to normal operation. Here, a $\lambda$ value can lie between 0.8 and 1.2. By means of this measure, a lowering of the temperature of the exhaust gas by up to 60° can be realized in real operation.

In combination with a twin-scroll exhaust-gas turbocharger, it is possible here to reduce the temperature difference between the individual channels. Here, for example in the case of a four-cylinder internal combustion engine, cylinders 2 and 3, the exhaust gas of which is cooled to a lesser extent owing to the shorter paths in the exhaust-gas manifold, are operated rich, and thus the exhaust gas is cooled further in relation to cylinders 1 and 4. The temperature difference between the scrolls thus becomes smaller, and component protection is improved. In the case of a cooled exhaust-gas manifold, where this effect is even more pronounced, this approach is even more expedient. Since, in particular owing to the cylinders which are operated rich, large quantities of unburned fuel residues and carbon monoxide arise in the untreated exhaust gas of the internal combustion engine, and an excess of oxygen passes into the untreated exhaust gas owing to the cylinders which are operated lean, the release of heat has a tendency to increase owing to the conversion of these in the exhaust-gas purification system. The temperature in the exhaust-gas purification system thus increases somewhat. Since the carbon monoxide emissions of the cylinders are very low in particular owing to the lean operation, the increase in this exothermic reaction is limited. The split factor, that is to say how the rich and lean operation is set per cylinder, must thus be set specifically for every internal combustion engine.

For internal combustion engines in the case of which the exhaust gas of all of the cylinders is merged already upstream of the exhaust-gas purification system or upstream of the turbine of the exhaust-gas turbocharger, the high temperatures can have the result that secondary reactions occur already upstream of the exhaust-gas purification system or of the turbine. In this way, the lowering of the temperature as a result of the lambda split is smaller but still present. In this case, depending on the structural design, it may be advantageous not for a rich exhaust-gas pulse to follow a lean exhaust-gas pulse, in accordance with the ignition sequence, but for multiple rich pulses to be followed by the same number of multiple lean pulses. The secondary reactions are thus reduced owing to the relatively long separation in terms of time between lean and rich, and are thus relocated into the catalytic converter again. The latter is capable of storing oxygen and thus buffering the time offset between the reaction partners required for the complete conversion.

The invention will be discussed in more detail below on the basis of two figures.

DETAILED DESCRIPTION OF THE DRAWINGS

Figure 1:
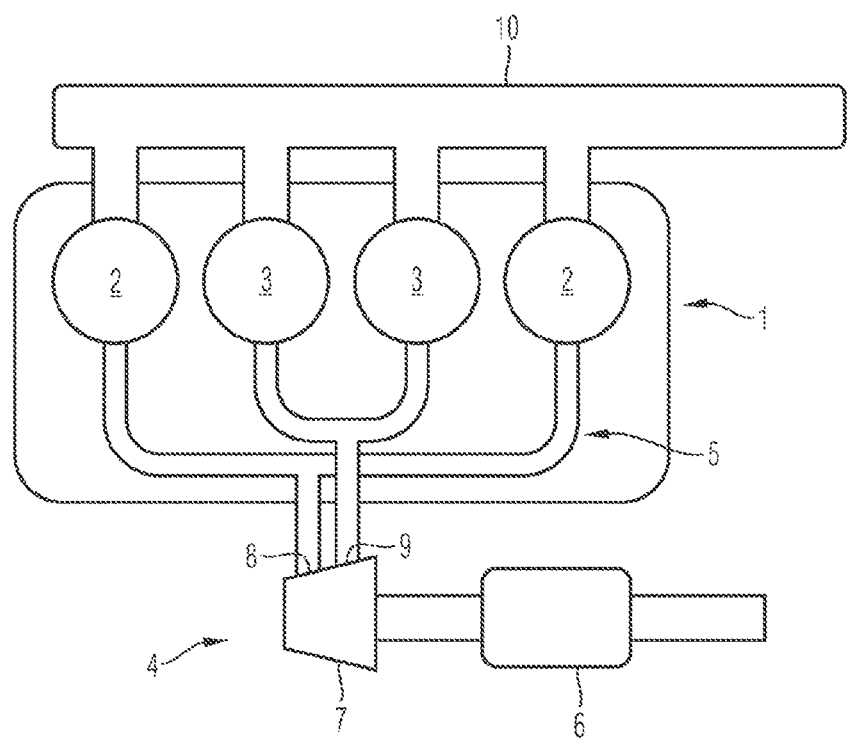
FIG. 1 schematically shows an internal combustion engine according to the invention.

FIG. 1 schematically shows an internal combustion engine 1 according to the invention, which has for example four cylinders. Through an air manifold 10, the internal combustion engine draws in fresh air for its two first combustion chambers 2 and its two second combustion chambers 3. The combustion chambers, which also correspond to the individual cylinders, are symbolically illustrated by circles. Here, the mixture formation may be performed for example by direct injection into combustion chambers 2, 3 and/or into the air manifold 10. The fuel-air mixture is burned in the combustion chambers 2, 3 and is discharged through an exhaust-gas manifold 5 into an exhaust-gas system 4. In the present exemplary embodiment, the exhaust gases flow firstly through a turbine housing 7 of an exhaust-gas turbocharger (not illustrated in any more detail) and onward through an exhaust-gas purification system 6. The exhaust-gas purification system 6 may for example be a 3-way catalytic converter. The turbine housing 7 and the exhaust-gas purification system 6 are part of the exhaust-gas system 4.

In this present exemplary embodiment, the exhaust-gas manifold 5 is integrated into the cylinder head (cylinder-head-integrated manifold), though this need not be the case. Irrespective of whether or not the exhaust-gas manifold 6 is integrated in the cylinder head of the internal combustion engine 1, and also irrespective of whether it is a cast manifold or an exhaust-gas manifold 5 insulated by means of an air gap, a first section of the exhaust-gas system 4 is better cooled from the first combustion chambers 2 to the turbine 7 than from the second combustion chambers 3 to the turbine 7. In another exemplary embodiment, the turbine 7 may also be omitted, such that the exhaust-gas purification system 6 is the first component that is flowed through by the exhaust gas in the exhaust-gas system 4. Furthermore, in the present exemplary embodiment, the exhaust-gas system 4 is cooled, in particular liquid-cooled, within the cylinder head of the internal combustion engine 1.

Furthermore, in the present exemplary embodiment, the turbine 7 is of two-channel configuration, that is to say it is a so-called twin-scroll turbine, with a first scroll 8 and a second scroll 9. Single-channel turbines, so-called mono-scroll turbines, may also be used for the internal combustion engine 1 according to the invention. It is preferable for the first section of the exhaust-gas purification system 4 to open into the first scroll and for the second section of the exhaust-gas purification system 4 to open into the second scroll 9.

With the present applied-ignition internal combustion engine 1, a method for operation which has the following method steps is now possible:
introducing air and fuel into the first combustion chamber 2 with a lean ratio ($\lambda > 1$),
igniting and combusting the air/fuel mixture in the first combustion chamber 2,
discharging the exhaust gas through the exhaust-gas system 4,
introducing air and fuel into the second combustion chamber 3 with a rich ratio ($\lambda < 1$),
igniting and combusting the air/fuel mixture in the second combustion chamber 3,
discharging the exhaust gas through the exhaust-gas system 4.

A further lowering of the exhaust-gas temperature level is possible by means of the following method steps:
adapting a center of combustion in the first combustion chamber 2 until an exhaust-gas temperature from the first combustion chamber 2 is at a minimum,
adapting a center of combustion in the second combustion chamber 3 until an exhaust-gas temperature from the second combustion chamber 3 is at a minimum.

This adaptation of the center of combustion may be performed for example by means of an engine control unit which is provided with the data by measurement sensors or wherein the data are stored in a characteristic map.

The center of combustion indicates the crank angle position at which 50% of the fuel mixture is converted and is furthermore used as a measure for the efficiency of the combustion. Combustion which is optimum from an efficiency aspect for Otto internal combustion engines lies at a center of combustion of approximately 8 degrees crank angle after ignition TDC.

Figure 2:
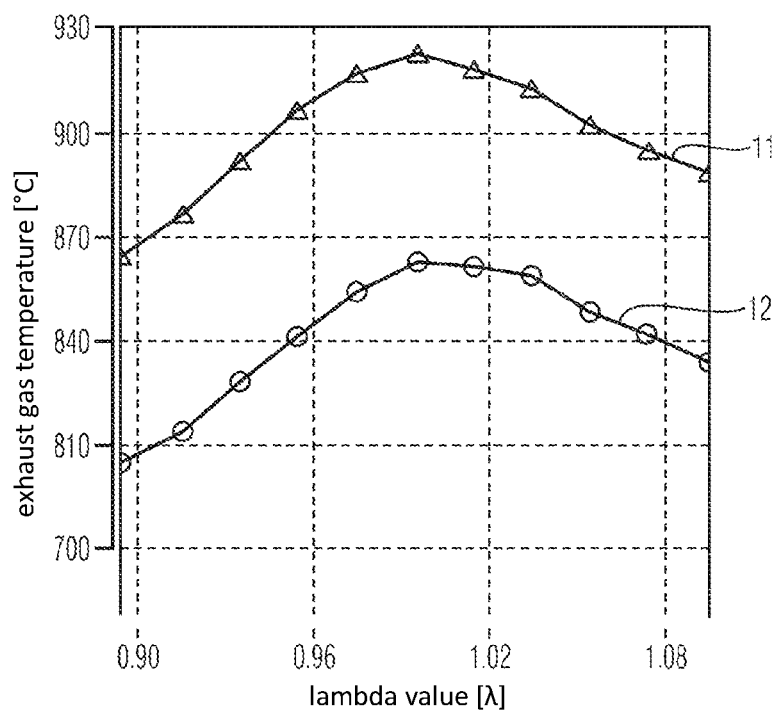
FIG. 2 shows, in a diagram, the effect according to the invention.

FIG. 2 shows the effect of the method according to the invention in a diagram.

A temperature of the exhaust gas upstream of the exhaust-gas purification system 6 or upstream of the turbine 7 is plotted on a y axis, from 780° C. to 930° C. A cylinder-selective $\lambda$ value is illustrated on an x axis, in a range from 0.9 to 1.08.

A first graph is labelled 11, and is representative of the exhaust-gas temperature from the first combustion chamber 2 upstream of the exhaust-gas purification system 6 in the case of variation of the lambda value from 0.9 to 1.08. A second graph is labelled 12, and is representative of the exhaust-gas temperature emerging from the second combustion chamber 3 upstream of the exhaust-gas purification system 6 in the case of variation of the lambda value from 0.9 to 1.08. The measurements that constitute the basis for the graphs are an adjustment of the lambda value uniformly for all cylinders of a multi-cylinder internal combustion engine in order to illustrate the effect according to the invention.

As can be seen in the diagram, a lowering of the exhaust-gas temperature in the rich range at approximately $\lambda=0.9$ is approximately 60° colder than in the case of operation with $\lambda 1$, whereas, in the case of a lean mixture at approximately $\lambda=1.08$, the lowering of the temperature is approximately 40° C. A further lowering in rich operation is possible in particular by means of an adaptation of the ignition angle.

LIST OF REFERENCE CHARACTERS

1 Internal combustion engine
2 First combustion chamber
3 Second combustion chamber
4 Exhaust-gas system
5 Exhaust-gas manifold
6 Exhaust-gas purification system
7 Turbine housing
8 First scroll
9 Second scroll
10 Air manifold
11 Exhaust-gas temperature, first combustion chamber
12 Exhaust-gas temperature, second combustion chamber

What is claimed is:
1. An applied-ignition internal combustion engine (1), comprising:
a first combustion chamber (2);
a second combustion chamber (3);

an exhaust-gas system (4) disposed at the first and second combustion chambers, wherein an exhaust-gas purification system (6) is disposed in the exhaust-gas system (4);

an exhaust-gas manifold (5);

wherein an exhaust gas from a combustion of an air/fuel mixture is configured to firstly flow through the exhaust-gas manifold (5) and is configured to subsequently flow through the exhaust-gas purification system (6) in the exhaust-gas system (4);

wherein a first section of the exhaust-gas system (4) from the first combustion chamber (2) to the exhaust-gas purification system (6) is configured to be cooled more than a second section of the exhaust-gas system (4) from the second combustion chamber (3) to the exhaust-gas purification system (6); and an engine control unit configured to operate the first combustion chamber (2) with a lean ($\lambda>1$) air/fuel mixture and to operate the second combustion chamber (3) with a rich ($\lambda<1$) air/fuel mixture such that an overall exhaust-gas lambda value at an inlet into the exhaust-gas purification system (6) is stoichiometric ($\lambda=1$);

wherein the engine control unit is further configured to adapt a first center of combustion in the first combustion chamber (2) until a first exhaust-gas temperature from the first combustion chamber (2) is at a first minimum and to adapt a second center of combustion in the second combustion chamber (3) until a second exhaust-gas temperature from the second combustion chamber (3) is at a second minimum.

2. The applied-ignition internal combustion engine (1) according to claim 1, wherein the exhaust-gas manifold (5) is integrated at least in a section in a cylinder head of the applied-ignition internal combustion engine (1).

3. The applied-ignition internal combustion engine (1) according to claim 1, wherein the exhaust-gas manifold (5) is configured to be cooled.

4. The applied-ignition internal combustion engine (1) according to claim 3, wherein the exhaust-gas manifold (5) is configured to be liquid-cooled.

5. The applied-ignition internal combustion engine (1) according to claim 1 further comprising a turbine housing (7) of an exhaust-gas turbocharger, wherein the turbine housing (7) is disposed in the exhaust-gas system (4) between the exhaust-gas manifold (5) and the exhaust-gas purification system (6).

6. The applied-ignition internal combustion engine (1) according to claim 5, wherein the exhaust-gas turbocharger is a twin-scroll exhaust-gas turbocharger.

7. The applied-ignition internal combustion engine (1) according to claim 6, wherein the first section of the exhaust-gas system (4) opens into a first scroll (8) of the exhaust-gas turbocharger and wherein the second section of the exhaust-gas system (4) opens into a second scroll (9) of the exhaust-gas turbocharger.

8. A method for operating the applied-ignition internal combustion engine (1) according to claim 1, comprising the steps of:

introducing the lean ($\lambda>1$) air/fuel mixture air into the first combustion chamber (2);

igniting and combusting the lean air/fuel mixture in the first combustion chamber (2);

discharging exhaust gas from the first combustion chamber (2) through the exhaust-gas system (4);

introducing the rich ($\lambda<1$) air/fuel mixture air into the second combustion chamber (3);

igniting and combusting the rich air/fuel mixture in the second combustion chamber (3);

discharging exhaust gas from the second combustion chamber through the exhaust-gas system (4);

adapting a first center of combustion in the first combustion chamber (2) until a first exhaust-gas temperature from the first combustion chamber (2) is at a first minimum; and adapting a second center of combustion in the second combustion chamber (3) until a second exhaust-gas temperature from the second combustion chamber (3) is at a second minimum.

* * * * *